Dec. 9, 1969    D. S. CHISHOLM    3,483,281
CENTRIFUGAL EXTRUSION EMPLOYING EDDY CURRENTS
Filed Oct. 27, 1967

INVENTOR.
Douglas S. Chisholm
BY Robert B. Ingraham
AGENT

United States Patent Office 3,483,281
Patented Dec. 9, 1969

3,483,281
CENTRIFUGAL EXTRUSION EMPLOYING EDDY CURRENTS
Douglas S. Chisholm, Midland, Mich., assignor to The Dow Chemical Company, Midland, Mich., a corporation of Delaware
Filed Oct. 27, 1967, Ser. No. 678,623
Int. Cl. B29f 3/08; B29b 1/03; H05b 9/00
U.S. Cl. 264—25                    12 Claims

ABSTRACT OF THE DISCLOSURE

A centrifugal extruder for thermoplastics is advantageously heated by eddy currents induced by a direct current magnetic field.

---

Figure 2:
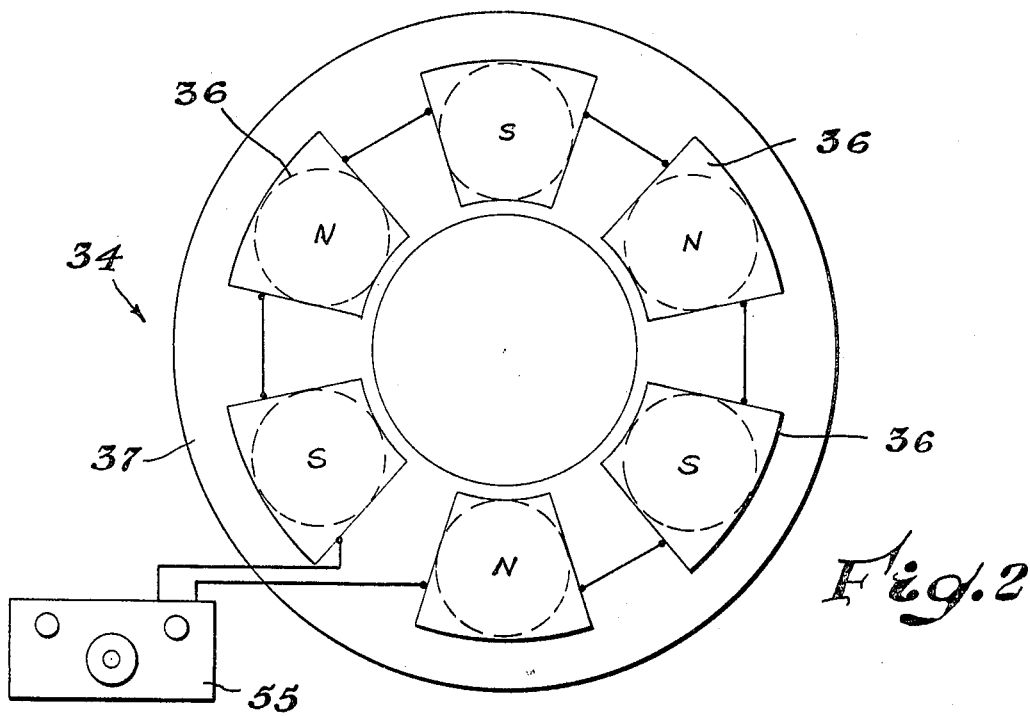

This invention relates to centrifugal extrusion, and more particularly relates to a method and apparatus for the centrifugal extrusion of thermoplastic materials. Many thermoplastic materials desirably are employed in the form of strands or pellets for molding, coating and various fabrication practices. Oftentimes, it is desirable to prepare thermoplastics in particulate form wherein the particles size is relatively small; that is, below about $\frac{1}{16}$ inch. A particularly advantageous and beneficial manner of obtaining such particles is by centrifugal extrusion of a strand and subsequent severing of the strand as the material issues from a rapidly rotating die. A method and apparatus for accomplishing this is set forth in my copending application Ser. No. 535,633, filed Jan. 13, 1966, now U.S. Letters Patent 3,358,323. In most extrusion operations, it is highly desirable to closely control the heat input to the extruder and therefore, the temperature of the melt being extruded. Variations in temperature of the melt can cause variations in the size of the particles or strands produced. Some synthetic resinous thermoplastic materials are temperature sensitive and the properties of the final product are dependent upon the total heat history of the polymer composition. Thus, it is desirable to process many synthetic resinous materials as rapidly as possible in order that minimal thermal degradation occurs. Centrifugal extrusion provides a means of converting a thermoplastic material to granular or strandular form with a minimal amount of high pressure equipment and provides particles of a size which are not in general economically feasible by conventional extrusion techniques employing a static die. It would be highly desirable if a centrifugal extruder could be fed with a thermoplastic material at a minimal temperature and the temperature of the thermoplastic material raised to a suitable temperature for extrusion without undue delay. Heating of a centrifugal extruder can be accomplished by induction heating or application of hot gas or flame. However, such methods are often less than desirable. Employing induction heating with alternating current, core heating is induced resulting in undesirable energy loss, and generally it is difficult to efficiently transfer energy to the rotor of the centrifugal die. As a centrifugal die functions as a gas pump discharging radially outwardly, gas heating in general is not efficient.

It would be desirable if there were available an improved method for heating centrifugal extruders.

It would also be beneficial if there were available an improved electrically heated centrifugal extruder.

It would also be advantageous if there were available an improved electrically heated centrifugal apparatus to which the heat input is readily controlled.

It would also be beneficial if there were available an apparatus for the centrifugal extrusion of thermoplastics which was capable of operation at relatively high temperatures.

These benefits and other advantages in accordance with the method of the present invention are achieved by rotating an electrically and thermally conductive extrusion die having a plurality of peripherally disposed discharge openings defined therein in communication with a generally centrally disposed thermoplastic receiving cavity, applying to the die a magnetic field of fixed polarity, rotating the die, thereby inducing an electrical current within the die sufficient to cause heating thereof.

Also contemplated within the scope of the present invention is an improved centrifugal extrusion apparatus comprising a rotor, the rotor defining an internal thermoplastic material receiving cavity and a peripheral edge, the rotor defining a plurality of passageways about the peripheral edge extending generally radially outwardly from an axis of rotation of the rotor and in communication with the material receiving cavity, means to rotate the rotor, the rotor being an electrically conductive material, a means to provide a magnetic field of fixed polarity adjacent the rotor and in operative asociation therewith, the rotor being adapted to rotate relative to the means to provide the magnetic field, the means to provide the magnetic field providing a field of sufficient strength to cause heating of the rotor, when the rotor is rotated, to a temperature sufficient to permit extrusion of the thermoplastic material therefrom.

Figure 1:
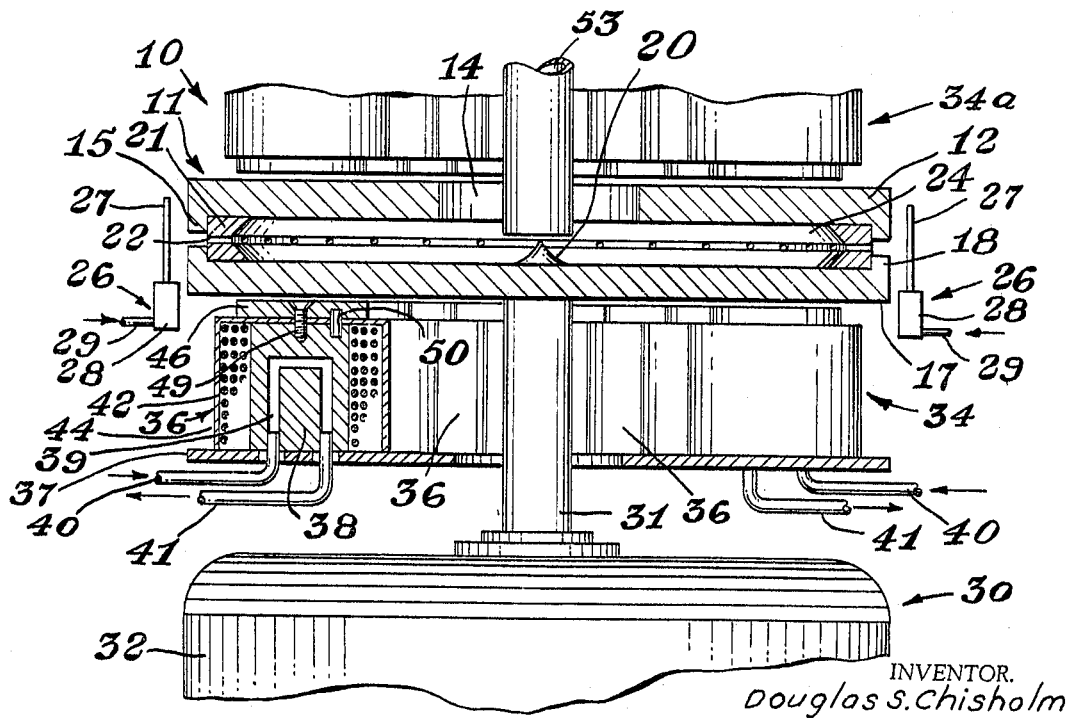

Further features and advantages of the present invention will become more apparent from the following specification taken in connection with the drawing wherein:

FIGURE 1 is a schematic representation of an apparatus in accordance with the present invention.

FIGURE 2 schematically represents a magnetic field producing means employed with the apparatus of FIGURE 1.

In FIGURE 1 there is schematically depicted a fractional, partially-in-section view of a centrifugal extrusion apparatus in accordance with the present invention generally designated by the reference numeral 10. The apparatus 10 comprises in cooperative combination a centrifugal extrusion die or rotor 11. The rotor 11 comprises a first metallic heat conductive body portion 12 having a generally planar discoidal configuration and defining a centrally disposed aperture or feed port 14. The body portion 12 has a dependent flange 15 circumferentially disposed thereabout. A second body portion 17 is oppositely disposed from the first body portion 12. The second body portion 17 is also of a generally discoidal planar configuration and has a peripheral flange 18 corresponding generally in size and dimension to the flange 15 of the first body portion 12. A flow control means or guide 20 is disposed on the second body portion 17 generally adjacent the feed port 14. A die ring 21 is disposed between the body portions 12 and 17. The die ring 21 defines a plurality of generally radially disposed passages 22 providing communication between space external to the periphery of the rotor 11 and with an internal cavity 24 defined by the body portions 12 and 17 and the die ring 21. Generally adjacent the periphery of the rotor 11 are disposed a plurality of knives or cutting means 26 adapted to sever strands issuing from the passages 22. Beneficially, the cutting means 26 comprise a blade 27, a support 28 and a source of a cooling gas 29 adapted to remove heat from the blade 27. The rotor 11 is in operative association with a rotating means 30 which comprises in operative combination a shaft 31 axially secured to the second body portion 17 remote from the cavity 24 and in operative association with a motor 32 adapted to rotate the shaft 31 at a desired speed. A magnetic field producing means 34 is disposed generally adjacent the second body portion 17 of the rotor 11 and the motor 32. The magnetic field producing means comprises a plurality of electromagnets 36 (one shown in section) supported on a base 37. The electromagnets 36 comprise a core 38 advantageously prepared from a single cylindrical piece of a material such as mold steel and being of nonlaminated structure. The core 38 defines an internal heat exchange fluid passageway 39 which is in operative communication with a heat exchange fluid supply means 40 and a heat exchange fluid discharge means 41. A coil 42 is disposed about the core 38. The core 38 and coil 42 advantageously are encapsulated within a radiant heat shield 44 advantageously having a reflecting metallic finish. A pole piece 46 is rigidly affixed relative to the core 38 by a fastener 49 and a locating pin 50. Beneficially, the electromagnets 36 are radially disposed about an axis of the shaft 31 and provide a magnet field of opposite polarity to the adjacent magnets. A second magnetic field producing means 34a is disposed adjacent the first body portion 12. A feed supply means 53 is disposed in generally opposed spaced relationship to the flow control means 20.

In FIGURE 2 there is schematically depicted a view of the magnetic field producing means 34 showing the configuration of the electromagnets 36 which, as illustrated, are series connected and are in operative communication with a variable voltage direct current power supply 55.

An extrusion apparatus generally as depicted in FIGURES 1 and 2 is prepared. The die is prepared from type 304 stainless steel and is supported on a 20-horsepower, 440-volt, 60-cycle alternating current motor. The electromagnets corresponding to the electromagnets 36 each have a resistance of 6.67 ohms and are arranged in alternate north-south arrangement as depicted in FIGURE 2. Runs of short duration to avoid excess rotor heating are made without polymer feed to the rotor. The results are set forth in the following table.

TABLE

| D.C. Field Excitation | | Kilowatts drawn by 20 HP motor |
|---|---|---|
| Volts | Amps | |
| 57 | 8.6 | 25 |
| 50 | 7.6 | 20 |
| 43 | 6.6 | 15 |
| 35 | 5.2 | 10 |
| 25 | 3.8 | 5 |
| 0 | 0 | 1 |

The gap between the motor and the pole piece of the electromagnets is about 1/16 inch. Granular polyethylene fed through the supply means 53 results in rapid formation of a plurality of fibers from the passageways 22 which are severed into granules by the cutting means 26. The extrusion rate is readily varied by varying the excitation to the electromagnets 36. Other thermoplastic materials are successfully prepared in fiber and pellet form including polystyrene, plasticized vinylidene chloride, copolymers containing about 85 weight percent vinylidene chloride and 15 weight percent vinyl chloride, polymethyl methacrylate and pitch. Fibers are successfully prepared from lime glass. Beneficial results are obtained whether the feed material is provided in a melted, powdered or granular form.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the centrifugal extrusion of thermoplastic material comprising
   rotating an electrically and thermally conductive extrusion die having a plurality of peripherally disposed discharge openings defined therein, the openings being in communication with a generally centrally disposed thermoplastic material receiving cavity,
   applying to the die a magnetic field of fixed polarity,
   rotating the die and thereby inducing an electrical current within the die sufficient to cause heating thereof to a temperature sufficient to cause melt flow of a thermoplastic material from the discharge openings due to centrifugal force,
   supplying thermoplastic material to the cavity,
   heating the thermoplastic material in the die, and subsequently
   discharging the material from the discharge openings.

2. The method of claim 1 wherein the thermoplastic material is a synthetic resinous thermoplastic material subject to heat degradation.

3. The method of claim 1 wherein the thermoplastic material is supplied to the die in heat plastified form.

4. The method of claim 2 wherein the heat plastified material is supplied to the die at a temperature below the heat plastifying temperature thereof.

5. The method of claim 1 wherein the magnetic field is supplied by direct current excitation of a plurality of fluid cooled electromagnets.

6. An improved centrifugal extrusion apparatus comprising in cooperative combination
   a rotor, the rotor defining
   an internal thermoplastic material receiving cavity,
   a peripheral edge and
   a plurality of passageways extending generally radially outward from an axis of rotation of the rotor and in communication with the material receiving cavity,
   means to rotate the rotor, the rotor being an electrically conductive material,
   means to provide a magnetic field of fixed polarity adjacent the rotor and in operative association therewith, the rotor being adapted to rotate relative to the means to provide the magnetic field, the means to provide the magnetic field providing a field of sufficient strength to cause heating of the rotor when the rotor is rotated to a temperature sufficient to permit extrusion of the thermoplastic material therefrom.

7. The apparatus of claim 6 wherein the means to provide a magnetic field comprises a plurality of electromagnets having non-laminated cores disposed adjacent to and spaced from the rotor.

8. The apparatus of claim 6 wherein the cores of the electromagnets define a passage therein for the passage of a cooling fluid.

9. The apparatus of claim 7 wherein a plurality of electromagnets are readily spaced about the axis of rotation of the rotor, each of the magnets having a pole piece and pole pieces of adjacent electromagnets being of opposite polarity.

10. The apparatus of claim 7 wherein each of the electromagnets is encased within a radiant heat shield.

11. The apparatus of claim 6 including a thermoplastic material supply means adapted to deliver thermoplastic material to the cavity.

12. The apparatus of claim 11 wherein the supply means is a source of particulate synthetic thermoplastic resinous material.

References Cited

UNITED STATES PATENTS

| | | | |
|---|---|---|---|
| 3,212,311 | 10/1965 | Inoue. | |
| 3,309,436 | 3/1967 | Larsen | 264—25 X |
| 3,351,694 | 11/1967 | Curato et al. | 264—176 |
| 3,365,522 | 1/1968 | Inoue | 264—22 |
| 3,400,189 | 9/1968 | Nacke | 264—173 X |

JULIUS FROME, Primary Examiner

J. H. WOO, Assistant Examiner

U.S. Cl. X.R.

18—12; 264—8, 176